United States Patent [19]

Kondo et al.

[11] 4,244,934

[45] Jan. 13, 1981

[54] PROCESS FOR PRODUCING FLEXIBLE GRAPHITE PRODUCT

[76] Inventors: Teruhisa Kondo, No. 28-8, Higashitoyonaka-cho, 1-chome, Toyonaka-shi, Osaka-fu; Jiro Ishiguro, Takesato-danchi 2-4-308, No. 89, Ooeda, Ooaza, Kasukabe-shi, Saitama-ken; Nobuatsu Watanabe, No. 136, Uguisu-dai, Nagaokakyo-shi, Kyoto-fu, all of Japan

[21] Appl. No.: 33,658

[22] Filed: Apr. 26, 1979

[30] Foreign Application Priority Data

Dec. 2, 1978 [JP] Japan ............... 53-148648

[51] Int. Cl.³ ............................................. C01B 31/04
[52] U.S. Cl. .................................. 423/448; 264/109
[58] Field of Search ................ 264/109, 343; 423/448

[56] References Cited

U.S. PATENT DOCUMENTS

| | | | |
|---|---|---|---|
| 3,206,327 | 9/1965 | Diefendorf | 428/408 |
| 3,404,061 | 10/1968 | Shane et al. | 264/109 |
| 3,414,381 | 12/1968 | Olstowski et al. | 264/42 |
| 3,475,244 | 10/1969 | Sanders | 423/448 |
| 3,527,856 | 9/1970 | Olstowski | 264/109 |

*Primary Examiner*—Donald E. Czaja
*Assistant Examiner*—J. R. Hall
*Attorney, Agent, or Firm*—Sprung, Felfe, Horn, Lynch & Kramer

[57] ABSTRACT

Wet graphite particles obtained by subjecting graphite particles to oxidizing treatment with nitric acid of comparatively low concentration and a permanganic acid salt and impregnating the treated graphite particles with a specific antioxidant comprising a metal salt of a boric acid ester of a saccharide, are heated to form expanded graphite masses, which are then compressed together to obtain a flexible graphite product. The thus obtained flexible graphite product is not only excellent in heat resistance and chemical inertness but also free of contamination with sulfur and chlorine, and is very useful in various applications.

10 Claims, No Drawings

PROCESS FOR PRODUCING FLEXIBLE GRAPHITE PRODUCT

This invention relates to a process for producing a flexible graphite product. More particularly, the present invention is concerned with a process according to which there can be produced a flexible graphite product that is not only excellent in heat resistance and chemical inertness but also free of contamination with sulfur and chlorine.

Heretofore, various processes have been proposed for producing flexible graphite products. The known processes generally consist in expanding graphite particles to large extent with respect to a bulk density ratio and compressing the resulting expanded graphite particles into a graphite sheet material, followed by fabrication to form a graphite product having a desired shape. For example, U.S. Pat. No. 3,404,061 discloses a process in which particles of natural graphite, kish graphite or pyrolytic graphite are immersed in an oxidizing bath comprising concentrated sulfuric acid and concentrated nitric acid under suitable temperature and time conditions and the resulting wetted graphite particles are, upon washing with water, heated to about 1,000° C. to obtain vermiform expanded graphite particles of which the dimension in the c direction (the direction perpendicular to the layers of carbon atoms) is expanded up to 80 times or more, preperably 100 to 300 times the original dimension, followed by compressing of the expanded graphite masses in the absence of a binder or agglutinant to form a graphite sheet material as a flexible graphite product.

Furthermore, with respect to a process for producing a flexible graphite product having an improved oxidation-resistance, there is known a process as disclosed in Japanese laid-open patent application specification No. 35205/1977. According to the process as mentioned above, graphite particles are immersed in an oxidizing bath comprising concentrated sulfuric acid and concentrated nitric acid at room temperature for a suitable period of time and subsequently the graphite particles are washed with water until the pH value of the graphite particles becomes 4 to 7, thereby to obtain wet graphite particles. The thus obtained wet graphite particles are subjected to antioxidizing treatment, that is, they are dipped in a 0.05 to 1.0 mole concentration aqueous solution of phosphoric acid or a suitable phosphate for 0.5 to 10 hours. The thus treated wet graphite particles are then expanded by heat treatment at 600° to 800° C. in air under atmospheric pressure. In this instance, expansion is effected so that the bulk density of the expanded graphite particles is 1/20 to 1/70 of that of the original graphite particles. Subsequently, the expanded graphite masses are compressed or molded into a flexible graphite product.

The flexible graphite products prepared by the conventional processes are still insufficient in oxidiation-resistance. Furthermore, as is apparent from the above, in the known processes, for obtaining wet graphite particles by oxidizing treatment, there is generally employed an oxidizing medium containing concentrated sulfuric acid having a concentration as high as 95 to 98%. Examples of the conventionally employed oxidizing media include mixtures of concentrated sulfuric acid with concentrated nitric acid, perchloric acid, chromic acid, potassium permanganate, iodic acid or periodic acid. Among them, a mixture of concentrated sulfuric acid with concentrated nitric acid or perchloric acid is often used. In any the conventional oxidizing treatments, concentrated sulfuric acid is used and, hence, there are caused various problems, for example, danger in operation, difficulty in disposal of spent oxidizing medium, high cost, etc.

In the conventional process for producing a flexible graphite product which comprises treating graphite particles with an oxidizing agent comprising, for example, concentrated sulfuric acid and perchloric acid to obtain wet graphite particles, heat-expanding the wet graphite particles to produce vermiform graphite masses and compressing the vermiform graphite masses to form a flexible graphite product, there is caused such a problem that in the flexible graphite product, a sulfur compound and a chlorine compound inevitably remain unremoved. Such remaining of the sulfur and chlorine compounds is caused by the use of special heating conditions for the expansion of the oxidized, wet graphite particles. Illustratively stated, the heat treatment of the wet graphite particles for expansion thereof is conducted at high temperatures but for a short time and, therefore, after the heat treatment, considerable quantities of a sulfur compound ($-SO_4H$) and a chlorine compound remain in and are fixed to the expanded graphite masses. Even if in order to eliminate the remaining compounds of sulfur and chlorine the graphite masses are subjected to a long time heat treatment at temperatures in the range where the graphite masses are not subject to oxidization with oxygen in air, it is difficult to completely eliminate the remaining compounds of sulfur and chlorine. If a flexible graphite product contaminated with the compounds of sulfur and chlorine is used as a sealing material or the like, the sulfur compound and chlorine compound tend to destroy or dissolve even the passive-state, corrosion-resistant surface layer of a metal material, e.g., stainless steel which is in contact with the flexible graphite product, thus causing corrosion of the metal material layer to occur and promoting progress of the corrosion, which leads to serious problems in the practical use of the flexible graphite material. Furthermore, flexible graphite products contaminated with the compounds of sulfur and chlorine have another drawback that when they are used in the field of electrochemistry, for example, as an electrode, the sulfur and chlorine values as the contaminants have an adverse effect on the intended function of the graphite product.

With a view to obviating the above-mentioned drawbacks inevitaly accompanying the conventional processes of producing flexible graphite products and to providing flexible graphite products having excellent properties, the inventors of the present invention have made extensive and intensive investigations. As a result, it has been found that by a process in which graphite particles are subjected to oxidizing treatment with nitric acid of comparatively low concentration and a permanganic acid salt, the resultant is treated with an antioxidant comprising at least one metal salt of a boric acid ester of a member selected from the group consisting of a reduction product of a monosaccharide, a dimer of a monosaccharide and combinations thereof, said metal being a member selected from metals of the group II of the periodic table, and the resulting wet graphite particles are expanded by heat treatment to obtain expanded graphite masses, followed by compression, there is obtained a flexible graphite product which is not only excellent in oxidation-resistance, tensile strength, impermeability to gases and handling characteristics but also is completely free of contamination with compounds of sulfur and chlorine. Based upon such a novel finding, the present invention has been made.

Accordingly, it is an object of the present invention to provide a process according to which there can be produced a flexible graphite product that is not only excellent in heat resistance and chemical inertness but also free of contamination with compounds of sulfur and chlorine.

It is another object of the present invention to provide a process as mentioned above, which can be conducted with ease and convenience due to the combined use of nitric acid of comparatively low concentration and a permanganic acid salt in the oxidizing treatment.

It is a further object of the present invention to provide a process of the character described, in which the nitric acid used in the oxidizing treatment can be effectively recovered and can be advantageously recycled for repeated use.

The foregoing and other objects, features and advantages of the present invention will be apparent to those skilled in the art from the following detailed description and appended claims.

According to the present invention, there is provided a process for producing a flexible graphite product which comprises the steps of (1) subjecting graphite particles to oxidizing treatment with nitric acid of comparatively low concentration and a permanganic acid salt, (2) washing the treated graphite particles with water, (3) contacting the washed graphite particles with an antioxidant comprising at least one metal salt of a boric acid ester of a member selected from a reduction product of a monosaccharide, a dimer of a monosaccharide and combinations thereof for a sufficient time for said antioxidant to permeate said washed graphite particles, said metal being a member selected from metals of the group II of the periodic table, (4) heating the resulting graphite particles to obtain expanded graphite masses, and (5) molding, under pressure, the expanded graphite masses to form a flexible graphite product.

Examples of the graphite particles employable in the process of the present invention include natural graphite, Kish graphite and synthetic graphites such as pyrolytic graphites. Of them, natural flake graphites are preferrably employed, and those having a sieve size of about 5 to 100 mesh (Tyler) and a high purity are especially preferred from a viewpoint of good quality of the final graphite product as well as ease and convenience in respective operations of the oxidizing treatment, washing with water, impregnation with the metal salt of the boric acid ester, heat treatment for expansion and compression molding.

A concentration of the nitric acid of comparatively low concentration to be employed in the process of the present invention may be about 60 to about 95%, preferably about 75 to about 80% by weight. An amount of the nitric acid of comparatively low concentration is not critical, and the nitric acid may be employed in an amount sufficient to well disperse therein the graphite particles so that a slurry of the graphite particles is formed. In general, the nitric acid may preferably be employed in an amount of about 300 to 500% by weight based on the amount of graphite particles.

Preferred examples of the permanganic acid salt to be employed in the process of the present invention include potassium permanganate, sodium permanganate and ammonium permanganate. An amount of the permanganic acid salt may be about 4 to about 20% by weight, preferably about 7 to about 10% by weight based on the amount of graphite particles.

Temperature to be employed in the oxidizing treatment of the step (1) as mentioned above may be room temperature to temperatures below the boiling point of the nitric acid of a predetermined concentration. Period of time of the oxidizing treatment may be about 1 to 5 hours, preferably about 2 to 4 hours. After the oxidizing treatment, the treated graphite particles are washed in the step (2) as mentioned above. Washing with water is rapidly conducted until the pH value of the washings becomes not less than 2, preferably not less than 4.

In the step (3) of the process of the present invention, the water-washed graphite particles are subjected to antioxidizing treatment with an antioxidant comprising at least one metal salt of a boric acid ester of a member selected from the group consisting of a reduction product of a monosaccharide, a dimer of a monosaccharide and combinations thereof, said metal being a member selected from metals of the group II of the periodic table.

As examples of the reduction product of a monosaccharide, there can be mentioned sorbitol and mannitol which are reduction products of dextrose and D-fructose, respectively. The dimers of monosaccharides are those which are generally called "disaccharides", and include, for example, sucrose, maltose and lactose. Among metals of the group II of the periodic table, there may advantageously be employed magnesium, calcium, zinc, barium and the like. Such polyhydroxy compounds as the reduction products of monosaccharides and the dimers of monosaccharides (hereinafter, both often referred to simply as "saccharide") may be employed alone or in combination. The metals of the group II of the periodic table may also be employed alone or in combination.

The above-defined metal salts of boric acid esters of saccharides to be employed in the present invention are novel compounds. These novel compounds can be prepared by a process in which a saccharide that is a polyhydroxy compound as defined above is reacted with boric acid and the resulting boric acid ester of saccharide is then neutralized with a compound of a metal of the group II of the periodic table. The thus obtained metal salts of boric acid esters of saccharides are soluble or comprraratively soluble in water as opposed to the salts of boric acid with metals of the group II of the periodic table which are insoluble or sparingly soluble in water. Therefore, the metal salts of boric acid esters of saccharides can be easily formulated into an aqueous solution thereof, and hence, can advantageously be used for the antioxidizing treatment in the step (3) of the process according to the present invention. As representative examples of the compounds of metals of the group II of the periodic table, there can be mentioned oxides, hydroxides, carbonates and basic carbonates of magnesium, calcium, zinc and barium. As preferred examples of the basic carbonate, there can be mentioned $4MgCO_3.Mg(OH)_2.5H_2O$, $3MgCO_3.Mg(OH)_2.5H_2O$ and mixtures thereof.

The metal salt of a boric acid ester of a saccharide may be prepared as follows. A saccharide selected from the group consisting of a reduction product of a monosaccharide, a dimer of a monosaccharide and mixtures thereof is mixed with water. An amount of water to be used may be about 30 to 100% by weight, preferably about 50 to 60% by weight, based on the saccharide employed. To the resulting mixture or solution is added boric acid to effect esterification reaction. An amount of boric acid to be added may be about 0.5 to 2 moles, preferably about 0.5 to 1.5 mole, more preferably about 1.0 mole per mole of the saccharide employed. The esterification reaction may be conducted under the ordinary reaction conditions for esterification with dehydration. The reaction temperature may be about 105° to 130° C., preferably 110° to 120° C. The reaction period may vary depending on the reaction temperature, but may generally be within the range of about 2 to 5 hours. As the reaction product, there is obtained a boric acid ester of the saccharide in the form of a transparent, viscous liquid. The thus obtained boric acid ester is diluted with water so that there is obtained an aqueous solution of the ester having a solid concentration of 30 to 80% by weight, preferably 40 to 60% by weight. To the resulting aqueous solution of the boric acid ester is added a compound of a metal of the group II of the periodic table in an amount of about 1 to 3 moles (in terms of amount of metal oxide) per mole (in terms of amount of boric acid anhydride) of the boric acid ester. In this connection, it is noted that the content of boron in the boric acid ester can be easily, accurately determined because the boric acid ester formation is quantitative. The reaction temperature for the formation of a metal salt of the boric acid ester by the reaction between the boric acid ester and the metal compound is not critical, and the reaction may proceed sufficiently at about room temperature. If desired, however, the reaction may be effected at elevated temperatures, so that the rate of reaction can be advantageously increased. In general, the reaction for the formation of a metal salt of the boric acid ester may be conducted at temperatures ranging from about room temperature to about 100° C. By conducting the reaction, while stirring, for about 20 to 30 minutes, there is obtained a desired metal salt of a boric acid ester of a saccharide in the form of a transparent aqueous solution. The solid concentration of the thus obtained aqueous solution of a metal salt of a boric acid ester of a saccharide is varied depending on the atomic weight of the metal incorporated as the salt of the boric acid ester, but may in general be within the range of about 50 to about 60% by weight. The above-mentioned solid concentration can be easily determined by the so-called xylene method.

An explanation on the mechanism of the above-mentioned formation of a metal salt of a boric acid ester of a saccharide will now be given, referring, for example, to the case where sucrose is employed as the saccharide. As well known, sucrose is a polyhydroxy compound represented by the following formula

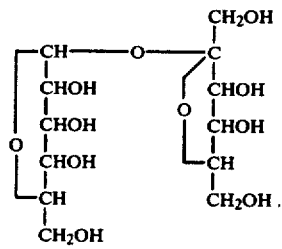

The hydroxyl group in sucrose is reacted with boric acid of the formula

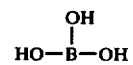

to effect esterification with dehydration, thereby forming an ester linkage represented by the formula

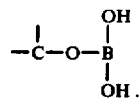

The formation of the ester linkage is believed to occur at one or some of the three —CH$_2$OH groups in sucrose. After formation of the ester linkage, the hydrogen moieties(acidic) in the above-mentioned boric acid ester structure are neutralized with a compound of a metal of the group II of the periodic table, which compound is selected from, for example, oxides, hydroxides, carbonates and basic carbonates of magnesium, calcium, zinc and barium. Thus, there is obtained a metal salt of a boric acid ester of sucrose which is a novel compound and useful as one of antioxidants to be used in the step (3) of the process according to the present invention.

A metal salt of a boric acid ester of a saccharide prepared according to the process as mentioned above is completely water-soluble, where the molar ratio of the boric acid values to the saccharide values in the metal salt is 1(one) or less. Where the above-mentioned molar ratio is more than 1(one), the metal salt is not so completely water-soluble but partially dispersed in water (i.e., comparatively water-soluble). Even the metal salt which is comparatively water-soluble as mentioned above, however, can be used, without any trouble, in the form of an aqueous solution in which the metal salt is partially dispersed (hereinafter, such as aqueous solution is often referred to simply as "aqueous solution"), as the antioxidant in the step (3) of the process of the present invention and the intended purpose can be attained by the use of such a comparatively water-soluble metal salt.

As mentioned above, a metal salt of a boric acid ester of a saccharide prepared according to the procedures as described above is water soluble or comparatively water-soluble and, therefore, can be easily used in the form of an aqueous solution for contacting the graphite particles therewith.

The contacting of the graphite particles with the antioxidant in the step (3) of the process of the present invention may be effected by impregnation. The impregnation may be conducted using a 3 to 30% by weight aqueous solution of a metal salt of a boric acid ester of a saccharide. The method for impregnation is not limited, and any of the ordinarily employed impregnation methods such as dipping, brushing, spraying, etc. can be utilized. From a view point of efficiency of working, a dipping method may preferably be used. In the dipping method, pressure is not critical, and dipping may be conducted under atmospheric pressure, super atmospheric pressure or reduced pressure. Dipping time is also not critical and dipping may be made for a sufficient time for the antioxidant to permeate the graphite particles. Dipping time may generally be within the range of about 30 minutes to several-ten hours.

The antioxidant-treated graphite particles are then heated to obtain expanded graphite masses. Heating temperature may suitably be within the range of about 400° to 1,300° C., preferably about 600° to about 1,000° C. Heating time may be varied depending on the heating temperature as well as the size of the graphite particles, but may generally be in the range of several seconds to ten and several hours. The thus obtained expanded graphite masses are molded under pressure to form a desired flexible graphite product. The heat treatment for expansion of the graphite in the step (4) may be done until the graphite particles are expanded to give expanded graphite masses having a bulk density of 0.005 to 0.015. The pressure molding in the step (5) may be conducted under a pressure of about 80 to about 400 Kg/cm$^2$, preferably about 100 to about 200 Kg/cm$^2$.

In the heat treatment in the step (4), according to the present invention, the organic moiety values in the metal salt of the boric acid ester of a saccharide are carbonized and the residual carbon thus formed is believed to serve, in the step (5) of molding under pressure, as a binder for the graphite masses, enabling an excellent flexible graphite product to be obtained without any use of additional binder material. Furthermore, when the graphite particles impregnated with a metal salt of a boric acid ester of a saccharide is heated, the metal salt is caused to form a two-component system glassy or ceramic compound, namely a $B_2O_3$-metal oxide system compound. Such a two-component system glassy or ceramic compound is chemically and firmly adsorbed onto the active sites in the interior of the carbonaceous material to form a caking structure. It is believed that the thus formed caking structure serves to effectively impart a high oxidation-resistance to the flexible graphite product.

An illustrative explanation on the procedures embodying the process of the present invention will now be given as follows.

Graphite particles are dispersed in nitric acid of a concentration of about 60 to about 95% by weight to make a slurry of the graphite particles. To the slurry is portion-wise added, while stirring, a permanganic acid salt such as potassium permanganate in an amount of about 4 to 20% by weight based on the graphite particles, thereby to effect oxidizing treatment. In this connection, it is noted that there may alternatively be employed such an operation that a mixture of nitric acid and a permanganic acid salt is prepared, and graphite particles are then immersed in the mixture to effect oxidizing treatment of the graphite particles. In such an operation, however, when a permanganic acid salt is added to nitric acid, the vapor of permanganic acid is generated. On the other hand, even if a mixture of nitric acid and a permanganic acid salt can be prepared by very carefully, very slowly adding the latter to the former, the mixture is instable and, hence, when graphite particles are added into the mixture the oxidizing reaction is caused to violently occur so that the oxidation of the graphite particles tends to be non-uniform, leading to poor quality of the final product. Therefore, the use of a mixture of nitric acid and a permanganic acid salt from the beginning is not recommended from a practical point of view, but the two-stage operation, namely, first preparing of a slurry of the graphite particles in nitric acid and secondly portion-wise adding of a permanganic acid salt to the slurry, is preferably conducted.

The treated graphite particles are washed with water until the pH value of the washings becomes not less than 2, preferably not less than 4. The thus obtained graphite perticles are dipped in a 2 to 30 weight % aqueous solution of a boric acid ester of a saccharide such as magnesium salt of the boric acid ester of sucrose for 30 minutes to several-ten hours. After the graphite particles are dipped in an aqueous solution of a metal salt of a boric acid ester of a saccharide, the content of the aqueous solution in the carbonaceous material may preferably be reduced to about 30 to about 50% by weight by a suitable method such as suction filtration, centrifugation or the like. Subsequently, the graphite particles are dried at temperatures of not higher than 100° C., and then subjected to heat-treatment at about 400° to about 1,300° C., preferably about 600° to 1,000° C. to obtain expanded graphite masses having a bulk density of about 0.005 to 0.015. The expanded graphite masses are subjected to molding under pressure, for example, compression molding and/or roll molding to obtain a desired shape of flexible graphite product having a specific gravity of about 0.8 to 1.8. In this connection, it is noted that the expanded graphite masses which have been treated with the antioxidizing agent comprising a metal salt of the boric acid ester can be advantageously molded, without incorporation thereinto of any additional binder or agglutinant, into a flexible graphite product having a high mechanical strength.

In the oxidizing treatment, the co-use of a permanganic acid salt and nitric acid is advantageous because even though the concentration of the nitric acid is comparatively low there can be obtained wet graphite particles which are capable of being sufficiently expanded by heating. In order to obtain sufficiently expandable graphite particles by the treatment of graphite particles with only nitric acid, it is necessry to employ high concentration nitric acid, i.e. fuming nitric acid. In that case, there is unavoidably generated large quantities of nitrogen oxides, the treatment of which is not only troublesome but also costly. By the co-use of comparatively low concentration nitric acid and a permanganic acid salt, according to the present invention, the above-mentioned disadvantages inevitably accompanying the conventional process in which high concentration nitric acid is employed as the oxidizing agent, can be effectively obviated.

As described, according to the process of the present invention, after graphite particles are treated with comparatively low concentration nitric acid and a permanganic acid salt, the treated graphite particles are subjected to antioxidizing treatment with antioxidant comprising a specific metal salt of a boric acid ester of a saccharide and heated for expansion to have a bulk density of 0.005 to 0.015, followed by compression-molding and/or roll-molding of the resulting expanded graphite masses to form a flexible graphite product. The thus formed graphite product is not only excellent in heat resistance and chemical inertness but also free of contamination with compounds of sulfur and chlorine. The freedom of the contamination leads to such an advantage that a flexible graphite sheet material prepared according to the process of the present invention can be advantageously used as a sealant without fear of causing corrosion of a metal material which is in contact with the sealant, and as a material for the electrochemical applications. Furthermore, a specific metal salt of a boric acid ester of a saccharide incorporated according to the process of the present invention serves to not only increase mechanical bonding strength in the heat-treated graphite particles due to the carbonaceous material formed by thermal decomposition of the metal salt of the boric acid ester, but also impart a high oxidation-resistance to the graphite due to the ceramic compound of a boron-metal system formed by the heat treatment so that an oxidation loss of the graphite is minimized not only at the step of the heat treatment in the process of the present invention but also at the time when the final flexible graphite product is exposed to temperatures as high as 500° C. or more.

In addition, it should be noted that the comparatively low concentration nitric acid used according to the process of the present invention can, after once used, be advantageously recycled, with replenishment of a suitable amount of a permanganic acid salt, so that the nitric acid can be reutilized for at least 10-time operations, occasionally for operations as many as up to about 20 times.

The present invention is further illustrated in more detail by the following examples, which should not be construed to be limiting the scope of the present invention.

The metal salts of boric acid esters of saccharides employed in Examples were prepared according to the methods shown in Referential Examples, respectively.

In Examples and Comparative Examples, measurement of a tensile strength was done substantially according to the method prescribed in Japanese Industrial Standard (JIS) K-6301-1975, item 4, and measurement of a specific gravity was done, using a 15 mm×60 mm×0.4 mm sample piece, according to the voltage dropping method prescribed in Japan Carbon Association Standard (JCAS-15-1971), item 6-1-6 (b).

REFERENTIAL EXAMPLE 1

To 260 g(1 mole in terms of sorbitol) of SORBIT D-70 (trade name of a 70 weight % aqueous solution of sorbitol manufactured and sold by Towa Kasei Kogyo Kabushiki Kaisha, Japan) were added 61.8 g(1 mole) of boric acid. The resulting mixture was heated, while stirring, at 110° to 120° C. for 3 hours to effect esterification with dehydration. The thus obtained boric acid ester of sorbitol was diluted with water so as to form an aqueous solution of the boric acid ester which solution had a solid content of 50% by weight. To the aqueous solution were portion-wise added, with agitation, 20.2 g(0.5 mole) of magnesium oxide to effect neutralization reaction. There was obtained the desired magnesium salt of boric acid ester of sorbitol. The thus obtained salt of the boric acid ester was a transparent, viscous liquid and easily soluble in water. The pH value of a 1 weight % aqueous solution of the salt was 7.2.

REFERENTIAL EXAMPLE 2

A mixture of 130 g(0.5 mole in terms of sorbitol) of SORBIT D-70 and 171 g(0.5 mole) of sucrose was heated, with agitation, at 100° C. to completely dissolve the sucrose therein. To the thus obtained uniform mixture were added 61.8 g(1 mole) of boric acid, and heating is then conducted at 115° C. for 3 hours to effect esterification with dehydration. The resulting ester was a light brown, viscous and water-soluble substance. The ester was diluted with water so as to have a solid content of 50% by weight, and then, 20.2 g(0.5 mole) of magnesium oxide were portion-wise added, with agitation, to effect neutralization reaction. There was obtained the desired magnesium salt of the boric acid ester which as also a light brown, viscous and water-soluble substance. The pH value of a 1 weight % aqueous solution of the salt was 8.4.

REFERENTIAL EXAMPLE 3

To 342 g(1 mole) of sucrose were added 170 ml of water, followed by heating to dissolve the sucrose in the water. To the resulting solution were added 61.8 g(1 mole) of boric acid and then, heating was conducted, with agitation, at 120° C. for 3 hours to effect esterification with dehydration. The resulting boric acid ester of sucrose was a brown, viscous and water-soluble substance.

The boric acid ester was diluted with water so as to have a solid content of 50% by weight, and was then neutralized with 47 g(0.5 mole in terms of MgO) of basic magnesium carbonate to obtain the desired magnesium salt of boric acid ester of sucrose which was brown and water-soluble. The pH value of a 1 weight % aqueous solution of the salt was 6.0.

REFERENTIAL EXAMPLE 4

The aqueous solution of the boric acid ester prepared in substantially the same manner as described in Referential Example 1 was subjected to neutralization with 157.7 g(0.5 mole) of barium hydroxide (octahydrate) to obtain a water-soluble, transparent, viscous product which was the desired barium salt of the boric acid ester. The pH value of a 1 weight % aqeuous solution of the barium salt was 7.9. The diluted aqueous solution of the barium salt was somewhat semi-turbid.

REFERENTIAL EXAMPLE 5

The aqueous solution of the boric acid ester prepared in substantially the same manner as described in Referential Example 1 was subjected to neutralization with 37 g(0.5 mole) of calcium hydroxide to obtain an extremely water-soluble, transparent, viscous product which was the desired calcium salt of the boric acid ester. The pH value of a 1 weight % aqueous solution of the calcium salt was 7.9.

REFERENTIAL EXAMPLE 6

Substantially the same procedures of preparing a boric acid ester as described in Referential Example 1 were repeated with the exception that 182 g of mannitol were used in place of 260 g of SORBIT D-70. There was obtained a boric acid ester of mannitol. The thus obtained boric acid ester of mannitol was diluted with water so as to have a solid content of 50% by weight. The resulting aqueous solution of the boric acid ester was subjected to neutralization with 157.7 g(0.5 mole) of barium hydroxide(octahydrate). The thus obtained barium salt of the boric acid ester was water-soluble. The pH value of a 1 weight % aqueous solution of the barium salt was 9.0.

REFERENTIAL EXAMPLE 7

An aqueous solution (solid content: 50% by weight) of a boric acid ester of mannitol prepared in substantially the same manner as described in Referential Example 6 was subjected to neutralization with 20.2 g(0.5 mole) of magnesium oxide to obtain the desired magnesium salt of the boric acid ester of mannitol which was a water-soluble, light orange-colored, viscous liquid. The pH value of a 1% by weight aqueous solution of the magnesium salt was 8.8.

EXAMPLE 1

100 g of Madagascar-produced natural flake graphite particles having a bulk density of 0.81 and a sieve size of 50 to 80 mesh (Tyler) were dispersed in 400 g of 75% nitric acid, and then, 7 g of potassium permanganate were portion-wise added, while stirring, at 30° C. As the potassium permanganate was added as mentioned above, the temperature of the system rose to about 40° C. After the addition of magnesium permanganate, the system was heated, and maintained at 60° C. for 2 hours to accomplish oxidation reaction. The liquid in the system was removed by centrifugation, and subsequently the resulting graphite particles were washed with water so that the pH value thereof became 6.0. The thus washed graphite particles were dehydrated by centrifugation so that the water content thereof became about 30%, to obtain wet graphite particles.

100 g of the wet graphite particles were dipped in 500 ml of an aqueous solution (concentration: 3% by weight) of mangesium salt of the boric acid ester of sucrose for 1 hour. The resulting soggy graphite particles were subjected to suction filtration so that the content of the aqueous solution was adjusted to 30% by weight.

The graphite particles treated as mentioned above were dried at temperatures below 100° C. and then heated in an electric furnace at 1,000° C. for 1 minute to obtain expanded, vermiform graphite masses having a bulk density of 0.012.

5 g of the vermiform graphite masses were charged into a 100 mm×150 mm metal mould and then compression-molded under a pressure of 100 Kg/cm² by means of a pressing machine. The compressed graphite masses were heated at 800° C. and further compressed under a pressure of 100 Kg/cm², followed by pressing by means of a constant speed roll so that the surface of the product was flattened and smoothened. There was obtained a flexible graphite sheet material having a thickness of 0.3 mm. A sample piece (30 mm×60 mm) of the flexible graphite sheet material was maintained at 600° C. in an electric furnace for 4 hours. From the weight difference between before and after the heat treatment, there was calculated an oxidation loss. Results are shown in Table 1, together with data of tensile strength and specific resistance.

COMPARATIVE EXAMPLE 1

Instead of the aqueous solution of the magnesium salt of the boric acid ester of sucrose, there was employed a 3 weight % aqueous solution of phosphoric acid. Except for the above, substantially the same procedures as described in Example 1 were repeated to obtain a flexible graphite sheet. An oxidation loss of the sheet was examined in the same manner as in Example 1. Results are also shown in Table 1.

COMPARATIVE EXAMPLE 2

Substantially the same procedures as described in Example 1 were repeated except that the antioxidizing treatment with the aqueous solution of the magnesium salt of the boric acid ester of sucrose was omitted and the wet graphite particles as prepared through the oxidizing treatment in Example 1 were subjected directly to preparation of graphite product and test in substantially the same manner as described in Example 1. Results are also shown in Table 1.

EXAMPLE 2

100 g of China-produced natural flake graphite particles having a bulk density of 0.67 and a sieve size of 50 to 100 mesh (Tyler) were dispersed in 400 g of 80% nitric acid, and then, 10 g of potassium permanganate were portion-wise added, while stirring, at 30° C. As the potassium permanganate was added as mentioned above, the temperature of the system rose by about 10° C. After the addition of magnesium permanganate, the system was heated, and maintained at 60° C. for 3 hours to accomplish oxidation reaction. The liquid in the system was removed by centrifugation, and subsequently the resulting graphite particles were washed with water so that the pH value thereof became 5.0. The thus washed graphite particles were dehydrated by centrifugation so that the water content thereof became about 30%, to obtain wet graphite particles.

100 g of the wet graphite particles were dipped in 500 ml of an aqueous solution (concentration: 3% by weight) of magnesium salt of the boric acid ester of sucrose for 1 hour. The resulting soggy graphite particles were subjected to suction filtration so that the content of the aqueous solution was adjusted to 30% by weight.

The graphite particles treated as mentioned above were dried at temperatures below 100° C. and then heated in an electric furnace at 1,000° C. for 1 minute to obtain expanded, vermiform graphite masses having a bulk density of 0.010.

5 g of the vermiform graphite masses were charged into a 100 mm×150 mm metal mould and then compression-molded under a pressure of 100 Kg/cm² by means of a pressing machine. The compressed graphite masses were heated at 800° C. and further compressed under a pressure of 100 Kg/cm², followed by pressing by means of a constant speed roll so that the surface of the product was flattened and smoothened. There was obtained a flexible graphite sheet material having a thickness of 0.3 mm. A sample piece (30 mm×60 mm) of the flexible graphite sheet material was maintained at 600° C. in an electric furnace for 4 hours. From the weight difference between before and after the heat treatment, there was calculated an oxidation loss. Results are shown in Table 1, together with data of tensile strength and specific resistance.

EXAMPLE 3

100 g of North Korea-produced natural flake graphite particles having a bulk density of 0.64 and a sieve size of 42 to 80 mesh (Tyler) were dispersed in 400 g of 80% nitric acid, and then, 8 g of potassium permanganate were portion-wise added, while stirring, at 30° C. As the potassium permanganate was added as mentioned above, the temperature of the system rose by about 10° C. After the addition of magnesium permanganate, the system was heated, and maintained at 60° C. for 3 hours to accomplish oxidation reaction. The liquid in the system was removed by centrifugation, and subsequently the resulting graphite particles were washed with water so that the pH value thereof became 6.0. The thus washed graphite particles were dehydrated by centrifugation so that the water content thereof became about 30%, to obtain wet graphite particles.

100 g of the wet graphite particles were dipped in 500 ml of an aqueous solution (concentration: 3% by weight) of magnesium salt of the boric acid ester of sucrose for 1 hour. The resulting soggy graphite particles were subjected to suction filtration so that the content of the aqueous solution was adjusted to 30% by weight.

The graphite particles treated as mentioned above were dried at temperatures below 100° C. and then heated in an electric furnace at 1,000° C. for 1 minute to obtain expanded, vermiform graphite masses having a bulk density of 0.009.

5 g of the vermiform graphite masses were charged into a 100 mm×150 mm metal mould and then compression-molded under a pressure of 100 Kg/cm² by means of a pressing machine. The compressed graphite masses were heated at 800° C. and further compressed under a pressure of 100 Kg/cm², followed by pressing by means of a constant speed roll so that the surface of the product was flattened and smoothened. There was obtained a flexible graphite sheet material having a thickness of 0.3 mm. A sample piece (30 mm×60 mm) of the flexible graphite sheet material was maintained at 600° C. in an electric furnace for 4 hours. From the weight difference between before and after the heat treatment, there was calculated an oxidation loss. Results are shown in Table 1, together with data of tensile strength and specific resistance.

EXAMPLE 4

100 g of Madagascar-produced natural flake graphite particles having a bulk density of 0.81 and a sieve size of 50 to 80 mesh (Tyler) were dispersed in 400 g of 75% nitric acid, and then, 9 g of sodium permanganate trihydrate were portion-wise added, while stirring, at 30° C. As the sodium permanganate trihydrate was added as mentioned above, the temperature of the system rose by about 10° C. After the addition of magnesium permanganate, the system was heated, and maintained at 60° C. for 2 hours to accomplish oxidation reaction. The liquid in the system was removed by centrifugation, and subsequently the resulting graphite particles were washed with water so that the pH value thereof became 6.0. The thus washed graphite particles were dehydrated by centrifugation so that the water content thereof became about 30%, to obtain wet graphite particles.

100 g of the wet graphite particles were dipped in 500 ml of an aqueous solution (concentration: 3% by weight) of magnesium salt of the boric acid ester of sucrose for 1 hour. The resulting soggy graphite particles were subjected to suction filtration so that the content of the aqueous solution was adjusted to 30% by weight.

The graphite particles treated as mentioned above were dried at temperatures below 100° C. and then heated in an electric furnace at 1,000° C. for 1 minute to obtain expanded, vermiform graphite masses having a bulk density of 0.011.

5 g of the vermiform graphite masses were charged into a 100 mm×150 mm metal mould and then compression-molded under a pressure of 100 Kg/cm² by means of a pressing machine. The compressed graphite masses were heated at 800° C. and further compressed under a pressure of 100 Kg/cm², followed by pressing by means of a constant speed roll so that the surface of the product was flattened and smoothened. There was obtained a flexible graphite sheet material having a thickness of 0.3 mm. A sample piece (30 mm×60 mm) of the flexible graphite sheet material was maintained at 600° C. in an electric furnace for 4 hours. From the weight difference between before and after the heat treatment, there was calculated an oxidation loss. Results are shown in Table 1, together with data of tensile strength and specific resistance.

Table 1

| Example No. | Specific gravity | Oxidation loss, % | Tensile strength Kg/cm² | Specific resistance, μΩcm |
|---|---|---|---|---|
| 1 | 1.2 | 37.6 | 65 | 600 |
| 2 | 1.2 | 31.5 | 66 | 600 |
| 3 | 1.2 | 30.2 | 69 | 550 |
| 4 | 1.2 | 34.0 | 69 | 600 |
| Comparative Ex. 1 | 1.2 | 52.2 | 62 | 550 |
| Comparative Ex. 2 | 1.2 | 80.7 | 60 | 500 |

EXAMPLES 5 TO 10

100 g of Madagascar-produced natural flake graphite particles having a bulk density of 0.81 and a sieve size of 50 to 80 mesh (Tyler) were dispersed in 400 g of 75% nitric acid, and then, 7 g of potassium permanganate were portion-wise added, while stirring, at 30° C. As the potassium permanganate was added as mentioned above, the temperature of the system rose to about 40° C. After the addition of magnesium permanganate, the system was heated, and maintained at 60° C. for 2 hours to accomplish oxidation reaction. The liquid in the system was removed by centrifugation, and subsequently the resulting graphite particles were washed with water so that the pH value thereof became 6.0. The thus washed graphite particles were dehydrated by centrifugation so that the water content thereof became about 30%, to obtain wet graphite particles.

On the other hand, using each of the metal salts of the boric acid esters obtained in Referential Examples 1 to 2 and 4 to 7, there were prepared six kinds of aqueous solutions each having a solid concentration of 3% by weight.

Using each of the thus prepared aqueous solutions, antioxidizing treatment was carried out as follows.

100 g of the wet graphite particles as prepared above were dipped in 500 ml of an aqueous solution of the metal salt of the boric acid ester for 1 hour. The resulting soggy graphite particles were subjected to suction filtration so that the content of the aqueous solution was adjusted to 30% by weight.

The graphite particles treated as mentioned above were dried at temperatures below 100° C. and then heated in an electric furnace at 1,000° C. for 1 minute to obtain expanded, vermiform graphite masses having a bulk density of 0.012.

5 g of the vermiform graphite masses were charged into a 100 mm×150 mm metal mould and then compression-molded under a pressure of 100 Kg/cm² by means of a pressing machine. The compressed graphite masses were heated at 800° C. and further compressed under a pressure of 100 Kg/cm², followed by pressing by means of a constant speed roll so that the surface of the product was flattened and smoothened. There was obtained a flexible graphite sheet material having a thickness of 0.3 mm. Two sample pieces (30 mm×60 mm) of the flexible graphite sheet material was maintained, in an electric furnace for 4 hours, at 400° C. and at 600° C., respectively. From the weight difference between before and after the heat treatment, there was calculated an oxidation loss. Results are shown in Table 2, together with data of tensile strength and specific resistance.

Table 2

| Example No. | No. of the Referential Example in which the employed metal salt of boric acid ester was prepared | Specific gravity | Oxidation loss, % | | Tensile strength, Kg/cm$^2$ | Specific resistance μΩcm |
|---|---|---|---|---|---|---|
| | | | 400° C./4hr | 600° C./4hr | | |
| 5 | Referential Example 1 | 1.2 | 2.8 | 36.8 | 68 | 550 |
| 6 | Referential Example 2 | 1.2 | 3.0 | 37.0 | 66 | 580 |
| 7 | Referential Example 4 | 1.2 | 2.4 | 36.0 | 67 | 620 |
| 8 | Referential Example 5 | 1.2 | 2.3 | 35.8 | 66 | 600 |
| 9 | Referential Example 6 | 1.2 | 2.8 | 36.5 | 67 | 620 |
| 10 | Referential Example 7 | 1.2 | 3.0 | 36.8 | 65 | 550 |

What is claimed is:

1. A process for producing a flexible graphite product which comprises the steps of:
   (1) subjecting graphite particles to oxidizing treatment with nitric acid having a concentration of about 60 to about 95% by weight and a permanganic acid salt;
   (2) washing the treated graphite particles with water;
   (3) contacting the washed graphite particles with an antioxidant comprising at least one metal salt of a boric acid ester of a member selected from the group consisting of a reduction product of a monosaccharide, a dimer of a monosaccharide and combinations thereof for a sufficient time for said antioxidant to permeate said washed graphite particles, said metal being a member selected from metals of the group II of the periodic table;
   (4) heating the resulting graphite particles to obtain expanded graphite masses; and
   (5) compressing the expanded graphite masses to form a flexible graphite product.

2. A process according to claim 1, wherein said reduction product of a monosaccharide is a member selected from the group consisting of sorbitol, mannitol and combinations thereof and said dimer of a monosaccharide is a member selected from the group consisting of sucrose, maltose, lactose and combinations thereof, and said metal is a member selected from the group consisting of magnesium, calcium, zinc and barium.

3. A process according to claim 1, wherein said antioxidant is an aqueous solution of said at least one metal salt.

4. A process for producing a flexible graphite product which comprises the steps of:
   (1) dispersing graphite particles in nitric acid having a concentration of about 60 to about 95% by weight to form a slurry of the graphite particles;
   (2) adding a permanganic acid salt to said slurry to effect oxidation of said graphite;
   (3) washing the oxidized graphite particles with water;
   (4) contacting the washed graphite particles with an antioxidant comprising at least one metal salt of a boric acid ester of a member selected from the group consisting of a reduction product of a monosaccharide, a dimer of a monosaccharide and combinations thereof for a sufficient time for said antioxidant to permeate said washed graphite particles, said metal being a member slected from metals of the group II of the periodic table;
   (5) heating the resulting graphite particles to obtain expanded graphite masses; and
   (6) compressing the expanded graphite masses to form a flexible graphite product.

5. A process according to claim 4, wherein the permanganic acid salt is employed in an amount of about 4 to about 20% by weight based on the graphite particles.

6. A flexible graphite product produced by a process of claim 1.

7. A flexible graphite product produced by a process of claim 2.

8. A flexible graphite product produced by a process of claim 3.

9. A flexible graphite product produced by a process of claim 4.

10. A flexible graphite product produced by a process of claim 5.